Figure 1:
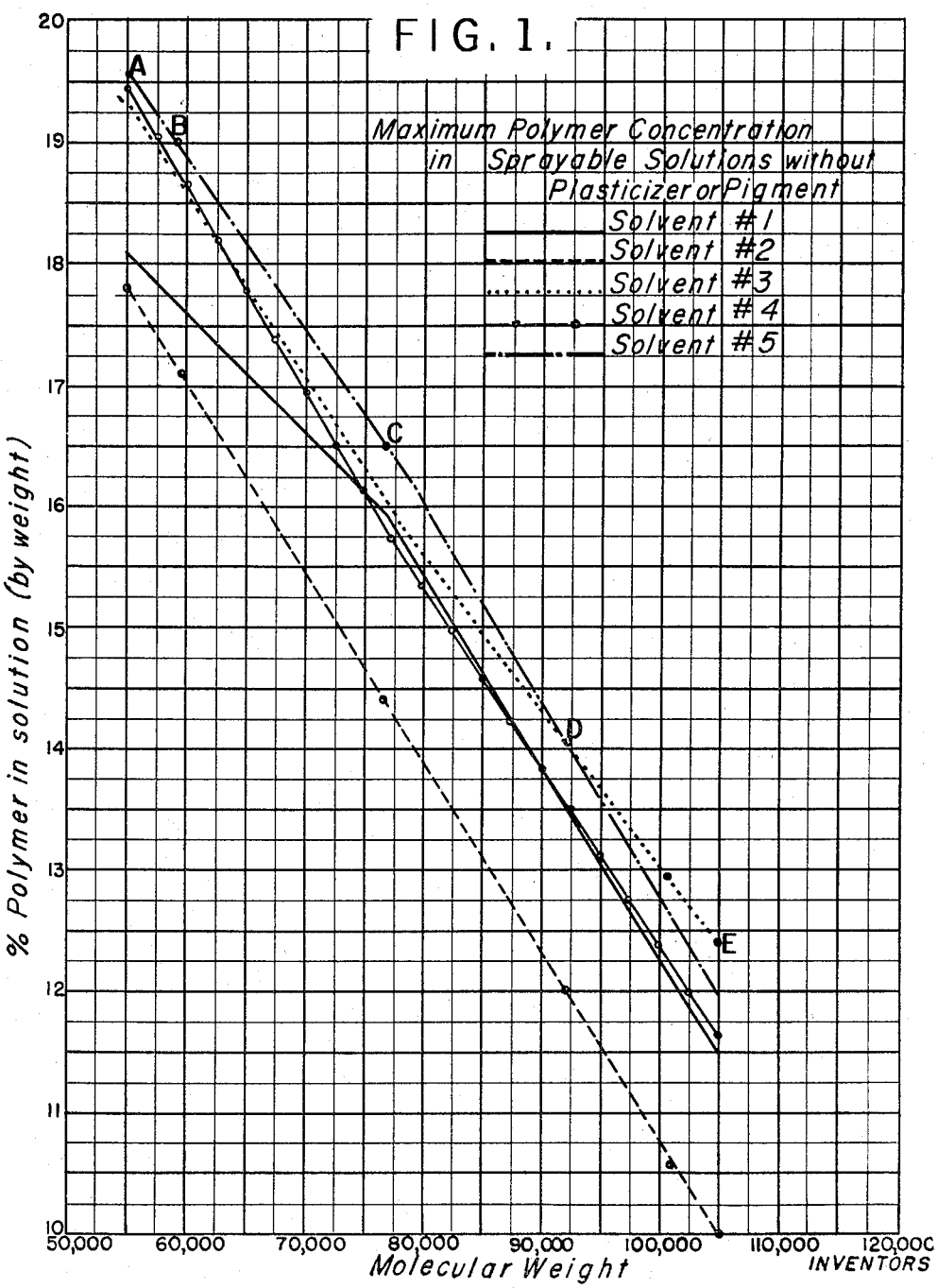

April 26, 1960 L. W. CRISSEY ET AL 2,934,510
COATING COMPOSITIONS CONTAINING POLYMER OF METHYL METHACRYLATE
Filed Feb. 2, 1956 5 Sheets-Sheet 4

INVENTORS
LAVERNE W. CRISSEY
JOHN H. LOWELL
BY
ATTORNEY

United States Patent Office 2,934,510
Patented Apr. 26, 1960

2,934,510
COATING COMPOSITIONS CONTAINING POLYMER OF METHYL METHACRYLATE

Laverne W. Crissey, Flint, Mich., and John H. Lowell, Brookline, Pa., assignors to E. I. du Pont de Nemours and Company, Wilmington, Del., a corporation of Delaware Application February 2, 1956, Serial No. 576,511

13 Claims. (Cl. 260—31.8)

This invention relates to coating compositions containing polymers of methyl methacrylate and more particularly to such coating compositions which can be applied by convenient commercial spraying techniques to yield smooth commercially acceptable coatings of substantial thickness.

By the term "polymer of methyl methacrylate" and related terms, as used herein, are meant a member or members of the group consisting of (a) homopolymers of methyl methacrylate, (b) copolymers of methyl methacrylate and another material copolymerizable therewith containing at least about 95% by weight of polymerized methyl methacrylate, (c) mixtures of such homopolymers, (d) mixtures of such copolymers and (e) mixtures of such homopolymers and copolymers, said other material being a member of the group consisting of methacrylic acid, a 1–4 carbon atom alkyl ester of acrylic acid, a 2–4 carbon atom alkyl ester of methacrylic acid, vinyl acetate, acrylonitrile and styrene.

Coating compositions containing a polymer of methyl methacrylate as the principal film-forming constituent have long been known and used. However, these compositions have well-known deficiencies. One deficiency is that they are relatively brittle or inflexible unless plasticized. A particularly objectionable deficiency is that they do not atomize well and tend to form clouds of stringy filaments, rather than finely divided wet particles, when sprayed through a conventional paint spray gun. This phenomenon is commonly referred to in the coating art as webbing or cobwebbing. The resulting coating on a smooth substrate is rough, stringy and non-uniform. Also, previous methyl methacrylate polymer coating compositions, to which enough additional solvent has been added to prevent cobwebbing during spray application, were so thin in viscosity or so low in non-volatile solids content, or both, that 5 to 10 or more successive separate thin coats were required to build up a film at least 1.5 mils thick which is smooth, uniform and free of blemishes.

Previous investigators have attempted to overcome these deficiencies by diluting or blending a polymer of methyl methacrylate with relatively high proportions of other film-forming ingredients, such as cellulose esters, alkyd resins, or other synthetic or natural resins, and by accepting the resulting substantial sacrifice in the desirable properties attributable to the polymer of methyl methacrylate.

Since nitrocellulose lacquers and oleoresinous or synthetic resin enamels are capable of building up the required 1.5 mils of thickness in three or less easily and economically applied spray coats, unmodified or slightly modified methyl methacrylate polymer coating compositions have necessarily been used only where an extremely thin coating is acceptable or where the high cost of applying a large number of separate thin coats to obtain a relatively thick coating is not objectionable.

The obvious consequence is that industry has not been able to utilize fully the advantageous properties of methyl methacrylate polymer coating compositions, such as good gloss retention during prolonged outdoor exposure.

It is apparent that relatively high molecular weight, of the order of 150,000 or 500,000, or even higher, is one of the principal causes of the high viscosity, low solids content or the undesirable webbing characteristics of coating compositions prepared from commercially available methyl methacrylate polymers.

Accordingly, it is a broad object of this invention to provide heretofore unknown low molecular weight methyl methacrylate polymer coating compositions rather than to provide improvements in known high molecular weight methyl methacrylate polymer coating compositions.

It is the principal specific object of this invention to provide sprayable non-webbing pigmented methyl methacrylate polymer coating compositions, which yield smooth uniform coatings at least 1.5 mils thick in not more than three separate coats, i.e. at least about 0.5 mil per coat.

A further specific object is to provide concentrated methyl methacrylate polymer coating compositions which, when diluted to a consistency suitable for spraying application, possess the characteristics described above.

These objects are accomplished by employing a polymer of methyl methacrylate having a molecular weight which is lower than the minimum heretofore supplied commercially by the polymer manufacturers and, further, by employing with such low molecular weight polymer of methyl methacrylate certain solvents or blends of solvents which contribute critically to the required high solids content of the desired coating compositions at convenient spraying viscosities, to their sprayability without cobwebbing, and to the essential smoothness of the resulting relatively thick coatings.

More specifically, these objects are accomplished by providing sprayable non-webbing coating compositions comprising a polymer of methyl methacrylate of 55,000–105,000 molecular weight and volatile solvent therefor, said polymer of methyl methacrylate being present in an amount by weight, based on the total weight of polymer and solvent, between a minimum of 10% and a maximum varying with the molecular weight in accordance with a curve based on the following table:

TABLE 1
*Maximum polymer content*

| Molecular weight: | Percent polymer by weight |
|---|---|
| 55,000 | 19.6 |
| 59,000 | 19.0 |
| 77,000 | 16.5 |
| 92,000 | 14.1 |
| 101,000 | 12.9 |
| 105,000 | 12.4 | said solvent consisting of fractions having boiling ranges substantially in accordance with the following table:

TABLE 2
*Boiling range of solvents*

| 10% fraction by volume [1] | Boiling range, ° C. |
|---|---|
| First | 50–120 |
| Second | 61–121 |
| Third | 64–122 |
| Fourth | 66–122 |
| Fifth | 67–132 |
| Sixth | 70–142 |
| Seventh | 73–152 |
| Eighth | 79–159 |
| Ninth | 90–164 |
| Tenth | 139–175 |

[1] As an example, the "first" 10% fraction by volume of a 500 cc. sample of solvent under test is the first 50 cc. collected; the "second" fraction is the second 50 cc. collected, etc.; and the "tenth" fraction is the final portion collected.

The ranges of boiling point may also be expressed in a table having more or less than ten fractions, e.g., in a table of five fractions, as follows:

TABLE 2A

*Boiling range of solvents*

| 20% fraction by volume: | Boiling range, °C. |
|---|---|
| First | 50–121 |
| Second | 64–122 |
| Third | 67–142 |
| Fourth | 73–159 |
| Fifth | 90–175 |

The solvent is also characterized by having a minimum solvent power (solvency) for said polymers of methyl methacrylate, and further by each fraction of the solvent having a certain solvency for said polymers. One method of expressing this solvent power is to specify it with respect to each 10% fraction, as in the following Table 2B.

TABLE 2B

*Comparative solvency of whole solvent and 10% by volume fractions thereof*

| 10% fraction by volume: | Comparative solvency range |
|---|---|
| Whole solvent | 0.39–2.15 |
| First | 0.00–2.19 |
| Second | 0.00–2.17 |
| Third | 0.00–2.16 |
| Fourth | 0.00–2.16 |
| Fifth | 0.10–2.11 |
| Sixth | 0.00–2.09 |
| Seventh | 0.00–2.09 |
| Eighth | 0.00–2.06 |
| Ninth | 0.05–2.06 |
| Tenth | 0.00–1.97 |

An equivalent and preferred method of expressing the solvent power of the solvents of this invention is to specify it with respect to the fractions which remain in the coating after lower boiling fractions progressively evaporate off as the coating dries. This preferred method, expressed in a table having five fractions, is the basis of the following Table 2C.

TABLE 2C

*Comparative solvency of whole solvent and of fractions remaining after lower boiling fractions have distilled off*

| Percent by Volume Distilled Off | Percent by Volume Remainder | Minimum Comparative Solvency of Remainder |
|---|---|---|
| 0 | 100 (whole solvent) | 0.39 |
| 20 | 80 | 0.46 |
| 40 | 60 | 0.23 |
| 60 | 40 | 0.06 |
| 80 | 20 | 0.00 |

The curve based on Table 1 is the curve ABCDE of Figure 1 of the accompanying drawing. This composite curve is the locus of points representing the maximum concentration of different molecular weight polymers of methyl methacrylate in solution in a solvent of this invention, which can be sprayed without webbing. The compositions of the solvents employed in determining the curves in Figure 1 are recorded in the following Table 3. The method of determining these curves is described fully later in this specification.

TABLE 3

*Solvent compositions*

| Solvent | 1 | 2 | 3 | 4 | 5 | 6 | 7 | 8 | 9 |
|---|---|---|---|---|---|---|---|---|---|
| Constituents: | | | | | | | | | |
| Acetone | 40.0 | 50.0 | 40.0 | 28.6 | | 12.9 | 35.6 | 10.3 | 9.1 |
| Toluene | 30.0 | | 15.0 | 21.4 | 50.0 | 25.4 | 16.8 | 25.4 | 46.2 |
| High Solvency Petroleum Hydrocarbon | 20.0 | | | 33.3 | | | | | |
| Amyl Alcohol | 3.3 | | 3.3 | 5.5 | | | | | |
| "Cellosolve" Acetate | 6.7 | 15.0 | 6.7 | 11.2 | | 6.6 | 13.1 | 4.6 | 13.2 |
| Methyl Ethyl Ketone | | 35.0 | | | | | | | |
| Petroleum Naphtha | | | 15.0 | | | | 22.9 | | |
| High Boiling Petroleum Naphtha | | | 20.0 | | | | | | |
| Xylene | | | | | 50.0 | 28.6 | 11.6 | 25.8 | 11.5 |
| Methyl Amyl Acetate | | | | | | 3.3 | | 3.3 | |
| Isopropanol | | | | | | 3.3 | | 3.3 | |
| Hexane | | | | | | 19.9 | | 17.3 | 20.0 |
| Diethyl Ether | | | | | | | | 5.0 | |
| Butyl Lactate | | | | | | | | 5.0 | |

It has been found that pigmented methyl methacrylate polymer coating compositions which fulfill the above-defined requirements, except for containing less than about 10% of a polymer of methyl methacrylate based on the total weight of polymer and solvent, when applied by conventional spraying, produce non-uniform films characterized by "sagging" or "curtaining" at thicknesses of 0.5 mil and above per coat. Hence, smooth uniform films of these compositions are obtained only when they are less than 0.5 mil thick, and therefore more than 3 coats are needed to build up the required thickness of 1.5 mils. The application of more than 3 coats is usually not commercially acceptable because of the cost involved in applying each coat and the cost of the additional solvent evaporated from compositions having such low polymer content, i.e. below about 10%.

Compositions fulfilling the above-defined requirements, except for containing more than the maximum polymer content indicated by curve ABCDE of Figure 1, web when sprayed, or are so near the critical webbing condition that an unreasonable degree of precision is required in their application, or the deposited coating is rough and irregular instead of having commercially acceptable smoothness and uniformity.

It has further been found that pigmented methyl methacrylate polymer coating compositions which fulfill the above-defined requirements, except that the polymer has an average molecular weight below about 55,000, are deficient in essential film properties. In particular they tend to be more brittle and to crack more readily, when the coated surface is dented by impact or is bent along a relatively long axis, than the polymers of higher molecular weight, e.g. 75,000. Such deficiencies prevent their commercial acceptance for use on thin deformable metal, such as is used in automobile bodies.

Methyl methacrylate polymer coating compositions in which the average molecular weight is above about 105,000, e.g. 120,000, 150,000 or 500,000, either have a maximum non-webbing solids content below the 10% minimum previously specified or, if their respective maximum non-webbing solids contents are slightly above 10%, e.g. 10.5–12%, they must be used at or near the critical concentration at which webbing occurs. This situation means, in practice, that substantially no factor of safety is available for preparing compositions above the minimum of 10% solids but below the 10.5, 11 or 12% at which webbing occurs, or that considerably more precision than is customary in large-scale commerical operations must be applied in preparing and spraying the compositions to produce the necessary thick, smooth uniform coating. The need for such precision is a recognized deficiency of previously known methyl methacrylate polymer coating compositions made from a relatively high molecular weight polymer of methyl methacrylate. As previously stated, the broad object of this invention is to provide new compositions that possess the desired properties rather than to improve or overcome the deficiencies of old compositions containing relatively high molecular weight polymers of methyl methacrylate. For these reasons, coating compositions containing, as the principal film-forming constituent thereof, a polymer of methyl methacrylate having a molecular weight substantially above 105,000 are not intended to form part of this invention.

Figure 2:
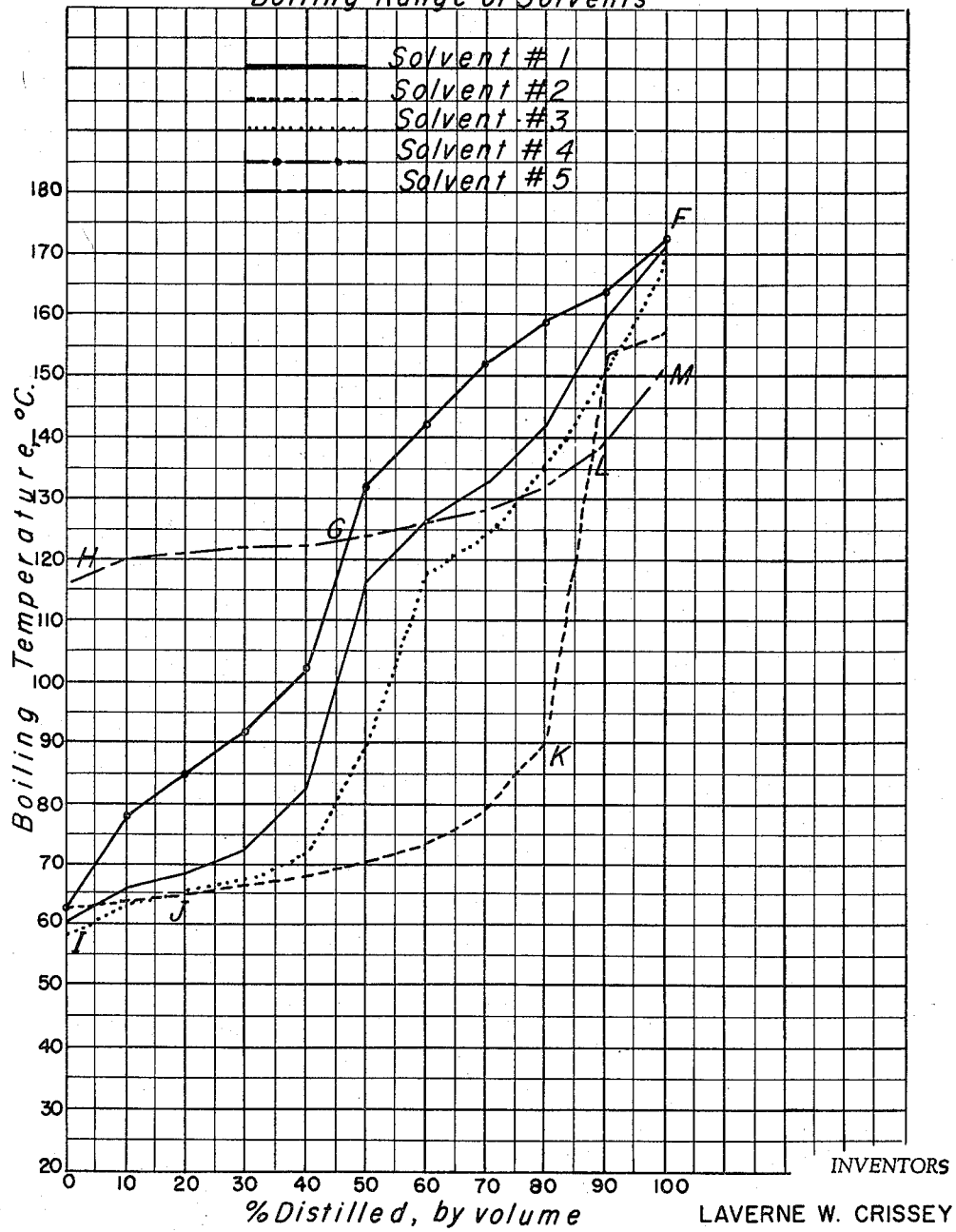

The boiling ranges of solvents 1–5 recorded in Table 3 are shown graphically in Figure 2 of the accompanying drawing. These solvents are represented by the area FGHIJKLM of Figure 2.

The boiling range and polymer of methyl methacrylate solvent power, or "solvency," of the solvents employed in this invention are determined by subjecting the solvent to fractional distillation in any manner which produces substantially the same results as the procedure of ASTM–D–268–46, Sampling and Testing Lacquer Solvents and Diluents, determining the initial and final boiling points of several (e.g., five or ten) successive equal fractions by volume, and retaining these fractions separate from each other for a subsequent test of their respective solvency.

The solvent fractions required for determining solvency by the preferred method are obtained by generally the same procedure, i.e., by distilling successive equal fractions (e.g., 20%, 40%, 60% and 80% respectively, of the original volume) from separate samples of the solvent and retaining the remainders (e.g., 80%, 60%, 40% and 20%, respectively) which are tested for their solvency, i.e. ability to dissolve a polymer of methyl methacrylate or to keep a dissolved polymer of methyl methacrylate in solution. This solvency test is conducted at normal room temperature by adding to the fraction enough of a "standard" polymer of methyl methacrylate solution (25% by weight of polymer of methyl methacrylate in C.P. toluene) to yield a mixture containing 1% by weight of polymer of methyl methacrylate and intimately mixing the two liquids. 25 cc. of the resulting mixture is then placed in a 125 cc. Erlenmeyer flask and titrated with C.P. heptane to an end point characterized by a cloud which obscures 10 point print in a manner similar to ASTM-D-1132-50T. The number of cc. of C.P. heptane is recorded as the "solvency" of the fraction. A relatively large volume of heptane, i.e. a high solvency value, indicates that the fraction is a relatively good solvent for the polymer of methyl methacrylate. In other words, a large amount of non-solvent heptane is added before the resulting mixture becomes a non-solvent for the polymer of methyl methacrylate, as indicated by the standard cloud point. Conversely, a low solvency value corresponds to a poor solvent because only a small amount of non-solvent heptane is required to produce the cloud.

It has been found that the "solvency" value is affected by the molecular weight of the polymer of methyl methacrylate employed in the "standard" solution of this test. It has also been found that this effect may be eliminated from consideration by comparing the solvency of the solvent fraction in question with the solvency of C.P. toluene, i.e. determining the value of the ratio:

$$\frac{\text{Solvency of the fraction in question}}{\text{Solvency of C.P. toluene}}$$

for each solvent fraction tested with a particular standard polymer of methyl methacrylate solution. This ratio is designated as the "comparative solvency" in this specification and in the appended claims.

The solvency of C.P. toluene is, of course, determined by adding the standard polymer of methyl methacrylate solution to C.P. toluene in the same manner as described above for a fraction of the solvent under test, titrating to the above described cloud point with C.P. heptane and recording the number of cc. required.

Thus a standard polymer of methyl methacrylate solution for use in this solvency test may be prepared without particular regard for the molecular weight of the polymer used, although it is obviously convenient to use a portion of the 55,000–105,000 molecular weight polymer employed in the coating compositions of this invention.

The boiling range and solvency characteristics of the various fractions of the nine different solvents of Table 3 are recorded in the following Table 4. It will be noted that the values recorded comply with the requirements of Tables 2, 2A, 2B and 2C.

TABLE 4

| 10% Fraction by Volume | Solvent No. | | | | | | | | |
|---|---|---|---|---|---|---|---|---|---|
| | 1 | 2 | 3 | 4 | 5 | 6 | 7 | 8 | 9 |
| | BOILING RANGE, °C. | | | | | | | | |
| First | 60–65.5 | 62–63.5 | 58–63 | 62–78 | 116–120 | 54.7–68.5 | 56.8–63.9 | 50.9–61.2 | 52.8–71.0 |
| Second | 65.5–68 | 63.5–64.5 | 63–65 | 78–85 | 120–121 | 68.5–73.7 | 63.9–66.8 | 61.2–70.5 | 71.0–79.7 |
| Third | 68–72 | 64.5–66 | 65–67 | 85–92 | 121–122 | 73.7–82.4 | 66.8–70.8 | 70.5–79.2 | 79.7–90.2 |
| Fourth | 72–82 | 66–67.5 | 67–71 | 92–112 | 122 | 82.4–95.3 | 70.8–77.2 | 79.2–93.5 | 90.2–102.3 |
| Fifth | 82–116 | 67.5–70 | 71–89 | 112–132 | 122–124 | 95.3–113.1 | 77.2–89.8 | 93.5–111.9 | 102.3–111.4 |
| Sixth | 116–126 | 70–73 | 89–117.5 | 132–142 | 124–126 | 113.1–124.7 | 89.8–109.8 | 111.9–122.0 | 111.4–117.2 |
| Seventh | 126–132 | 73–79 | 117.5–124 | 142–152 | 126–128 | 124.7–129.3 | 109.8–120.1 | 122.0–127.8 | 117.2–120.3 |
| Eight | 132–142 | 79–90 | 124–135 | 152–159 | 128–132 | 129.3–134.0 | 120.1–128.0 | 127.8–134.0 | 120.3–126.2 |
| Ninth | 142–159.5 | 90–153 | 135–150.5 | 159–164 | 132–139 | 134.0–139.7 | 128.0–139.7 | 134.0–143.1 | 126.2–137.2 |
| Tenth | 159.5–171 | 153–157 | 150.5–169 | 164–172 | 139–152 | 139.7–146.7 | 139.7–153.8 | [1] 143.1–174.3 | 137.2–154.0 |
| COMPARATIVE SOLVENCY [2] OF WHOLE SOLVENT AND 10% BY VOLUME FRACTIONS THEREOF | | | | | | | | | |
| Whole Solvent | 1.72 | 2.16 | 0.81 | 1.45 | 0.70 | 0.42 | 0.62 | | 0.39 |
| First | 2.19 | 2.13 | 1.48 | 2.16 | 0.73 | 0.00 | 1.23 | | 0.00 |
| Second | 2.17 | 2.13 | 1.48 | 2.11 | 0.76 | 0.00 | 1.18 | | 0.00 |
| Third | 2.16 | 2.13 | 1.48 | 2.11 | 0.75 | 0.00 | 1.10 | | 0.00 |
| Fourth | 2.16 | 2.11 | 1.40 | 2.05 | 0.73 | 0.00 | 1.00 | | 0.00 |
| Fifth | 2.00 | 2.11 | 1.14 | 1.63 | 0.71 | 0.25 | 0.73 | Not Run | 0.10 |
| Sixth | 1.67 | 2.09 | 0.40 | 1.32 | 0.71 | 0.53 | 0.00 | | 0.55 |
| Seventh | 1.40 | 2.09 | 0.06 | 1.00 | 0.63 | 0.77 | 0.00 | | 0.87 |
| Eighth | 1.22 | 2.06 | 0.14 | 0.63 | 0.59 | 0.81 | 0.00 | | 1.35 |
| Ninth | 0.65 | 2.06 | 0.05 | 0.29 | 0.46 | 0.78 | 0.24 | | 1.35 |
| Tenth | 0.14 | 1.97 | 0 | 0 | 0.40 | 0.83 | 1.10 | | 1.02 |

See footnotes at end of table.

Table 4—Continued

COMPARATIVE SOLVENCY [2] OF WHOLE SOLVENT AND OF FRACTIONS REMAINING AFTER LOWER BOILING FRACTIONS HAVE DISTILLED OFF

| Percent by Vol. Distilled Off | Percent by Vol. Remainder | | | | | | | | | |
|---|---|---|---|---|---|---|---|---|---|---|
| 0 | 100 (whole solvent) | 1.72 | 2.16 | 0.81 | 1.45 | 0.70 | 0.42 | 0.62 | 0.47 | 0.39 |
| 20 | 80 | 1.56 | 2.17 | 0.65 | 1.19 | 0.70 | 0.51 | 0.46 | 0.61 | 0.59 |
| 40 | 60 | 1.28 | 2.13 | 0.34 | 0.87 | 0.59 | 0.61 | 0.23 | 0.79 | 0.89 |
| 60 | 40 | 0.93 | 2.11 | 0.06 | 0.54 | 0.54 | 0.75 | 0.14 | 0.95 | 1.18 |
| 80 | 20 | 0.39 | 2.08 | 0.00 | 0.25 | 0.45 | 0.76 | 0.68 | 1.09 | 1.31 |

[1] Dry end point avoided to prevent peroxide explosion hazard by adding 5 cc. of heavy mineral oil.
[2] In this determination the "standard" solution contained a polymer of methyl methacrylate having a molecular weight of 77,000. Solvency of C.P. toluene=6.3; i.e. 6.3 cc. C.P. heptane required to titrate (to the cloud point) 25 cc. of a 1% solution of this polymer of methyl methacrylate in C.P. toluene.

TABLE 4A

*Comparative solvency of whole solvent and of fractions remaining after lower boiling fractions have distilled off*

| Percent by Volume Distilled Off | Percent by Volume Remainder | Range of Comparative Solvency of Remainder |
|---|---|---|
| 0 | 100 (whole solvent) | 0.39–2.16 |
| 20 | 80 | 0.46–2.17 |
| 40 | 60 | 0.23–2.13 |
| 60 | 40 | 0.06–2.11 |
| 80 | 20 | 0.00–2.08 |

By the term "sprayable non-webbing coating composition" and related terms, as used in the description of this invention and in the appended claims, are meant coating compositions which can be sprayed under normal spraying conditions for conventional coating compositions without depositing on the article being coated any filaments, strings or "cobwebs" of coating compositions which are permanent, i.e. which do not disappear by dissolving and/or flowing into the surrounding coating to produce a smooth uniform film before the coating has dried. In other words, in the cloud of spray deposited from a "non-webbing coating composition," the shape of the deposited particles is substantially round, elliptical or egg-shaped as contrasted with filamentary, stringy or elongated to a length which is several times the average diameter.

A spraying test procedure for determining the webbing characteristics of a coating composition is as follows:

The composition in question, i.e. a polymer solution or a complete coating composition, is sprayed in a conventional paint spray booth using conventional spraying equipment. The only deviation from normal practice is that a single burst of spray is directed toward the test panel so that the spray particles are deposited in a scattered pattern and their individual shapes can be examined, rather than continuing the spraying until a complete coating on the surface of the test panel is obtained.

The particular spray equipment is not critical, and a wide variety offered by the various equipment manufacturers may be used. However, obviously, it is most convenient to use equipment of the same general character as that with which the compositions are to be applied in commercial practice.

As a specific example of this test procedure, a 4″ x 12″ polished black glass plate is supported in a nearly vertical position in a spray booth having a normal inward flow of air. The composition is placed in the cup of a De Vilbiss Model MBC spray gun, having a #30 air cap with an E tip and needle, connected to a supply of compressed air at 50 pounds per square inch gage. The gun is operated for a short period, during which the usual adjustments of air flow, liquid flow and spray pattern are made to produce normal conditions. Then, with the gun held at 3–5 feet perpendicularly from the front of the test panel, a single burst of spray is directed toward the panel and a deposit of scattered particles is obtained on the panel for examination.

Figure 3:
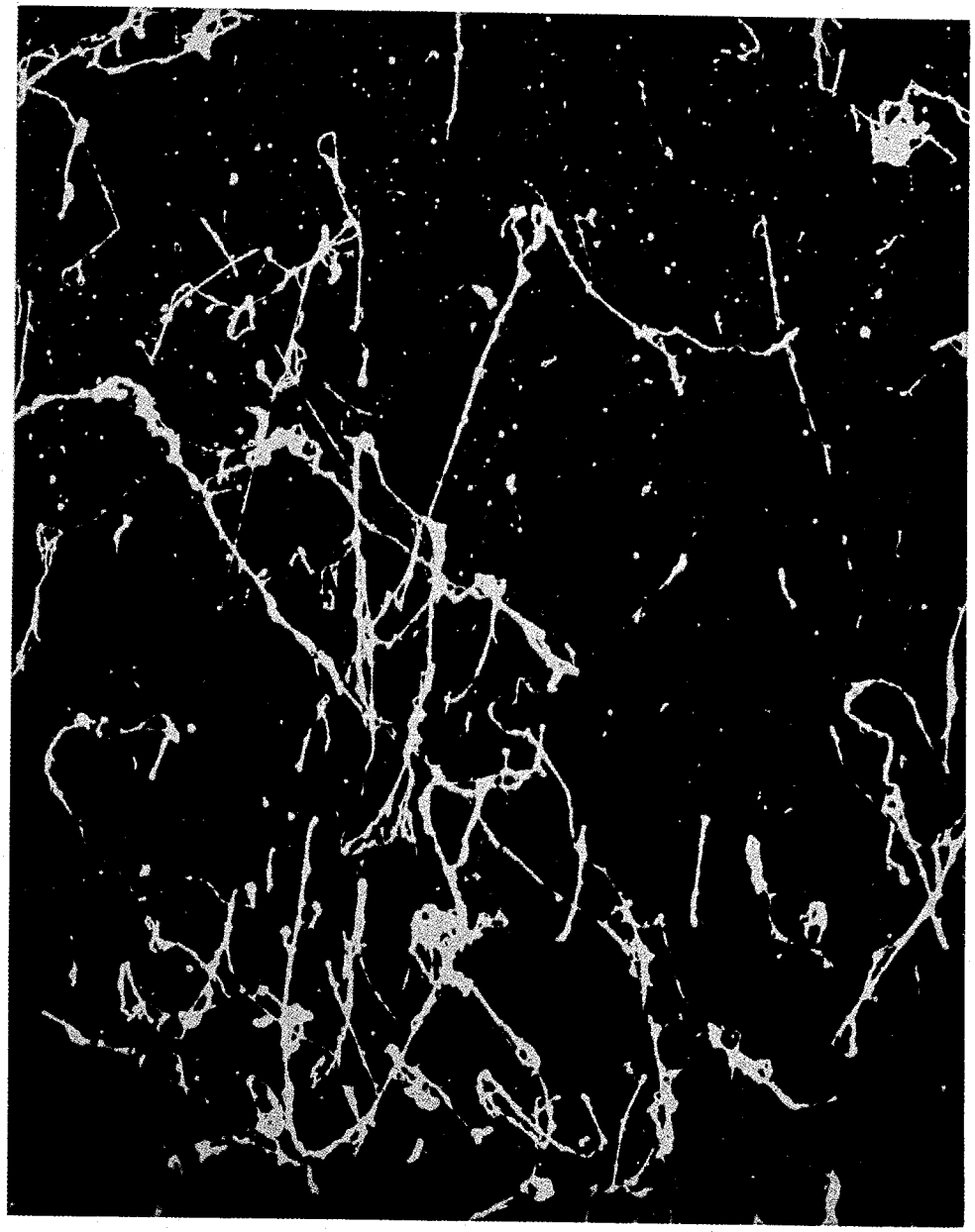
Figure 4:
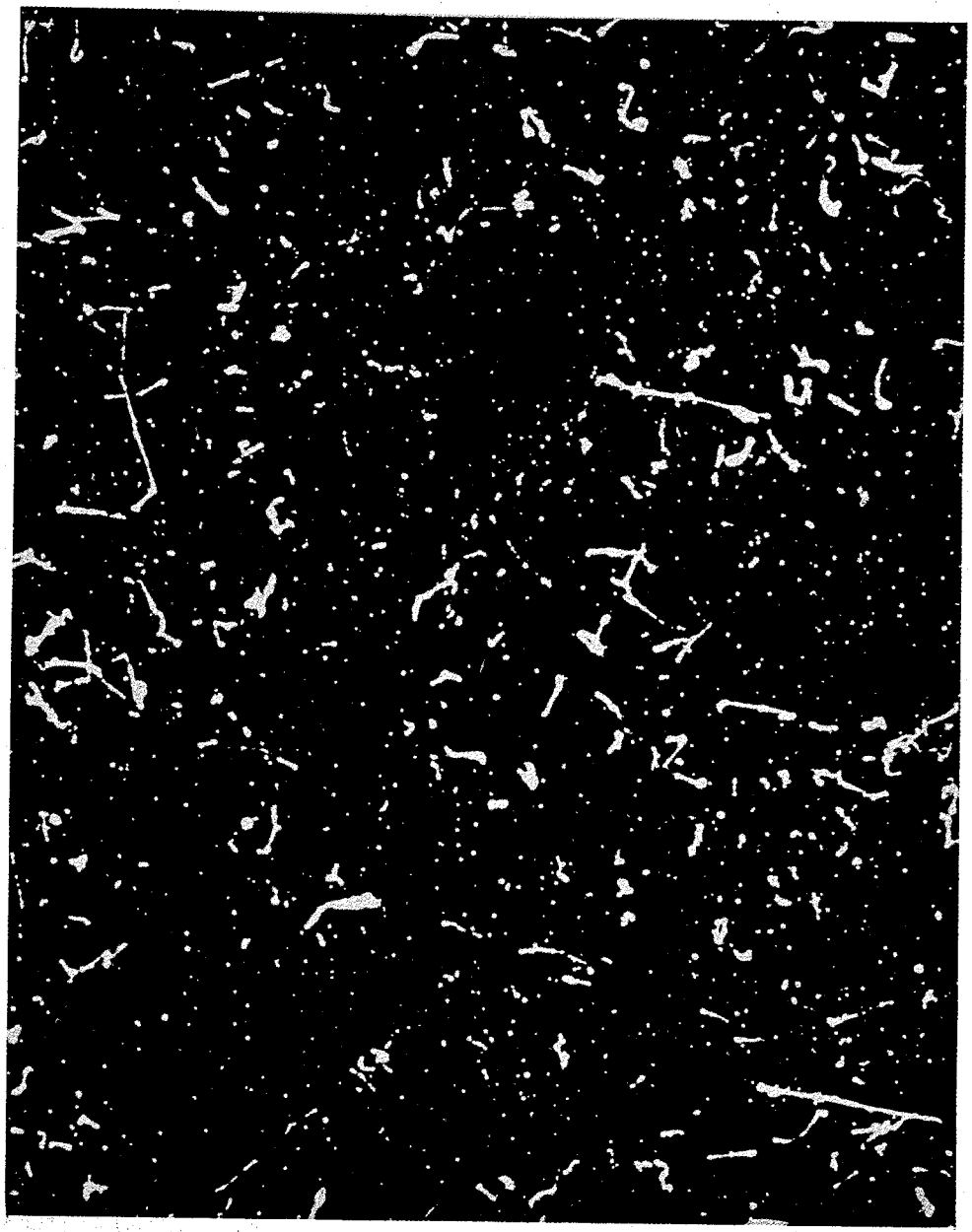
Figure 5:
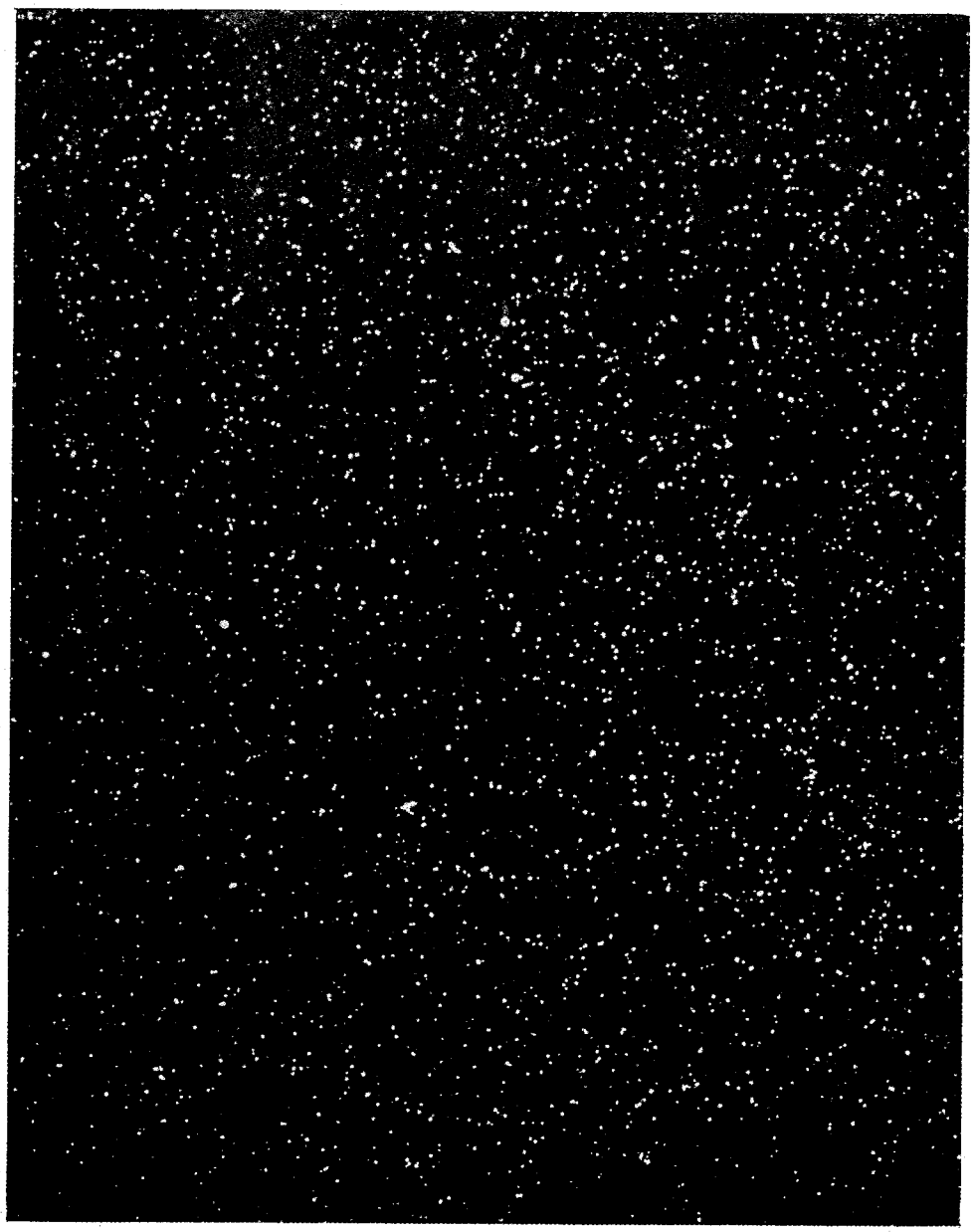

The differences in appearance of the deposits on illustrative test panels prepared by this procedure are shown in the accompanying Figures 3, 4 and 5, which are photolithographic reproductions of 7 diameter enlarged photographs of such test panels.

Although the deposits on the actual test panels are easily visible by the naked eye, actual-size photolithographs do not readily show them.

In the illustration, Figure 3 shows considerable webbing, i.e. a large number (proportion) of filaments. If the spraying of the coating compositions used in preparing this panel is continued until the whole surface is coated, the resulting coating is a rough, irregular mat of overlapping filaments similar to the "cocoon" type of coating used for preserving irregularly shaped objects, such as naval cannon and the like. The resulting coating accordingly is not acceptable to those industries requiring smoothness and uniformity of appearance in protective and decorative coatings.

Figure 4 shows less webbing, i.e. fewer (a lower proportion of) filaments, or somewhat connected lines of particles, which produce objectionable roughness or non-uniformity in a coating if spraying is continued until the surface is completely covered.

Figure 5 shows a complete absence of webbing, i.e. all of the particles are separated and round, and is representative of the sprayable non-webbing coating compositions of this invention. A similar pattern of distinct and separate round particles is characteristic of other coating compositions which yield smooth non-webbing coatings by spray application, such as enamels and lacquers prepared from alkyd resins, urea-, melamine- or phenol-formaldehyde resins, cellulose esters, vegetable oils, or other well-known organic film-forming materials, or combinations thereof.

The maximum non-volatile solids content of a polymer of methyl methacrylate solution or a methyl methacrylate polymer coating composition which can be sprayed without webbing is readily determined by conducting a series of the above-defined spraying tests, starting with the most concentrated composition which can conveniently be prepared and alternately spraying it and adding measured quantities of further solvent until just sufficient dilution has occurred to permit spraying without webbing. The data on which Table 1 is based were obtained in this manner by dissolving each of several polymers of methyl methacrylate having different molecular weights between 55,000 and 105,000 in each of solvents 1–5 of Table 3 and determining the maximum polymer content at which each resulting solution could be sprayed without webbing.

The data on which the curves for solvents 1–5 in Figure 1 are based were derived from a single determination, and some deviation from these data would be expected when other single determinations are run. However, the line ABCDE has been found to represent the maximum solids that is sprayable without webbing for various combinations of molecular weight and solvent.

The polymer of methyl methacrylate of 55,000–105,000 molecular weight employed in this invention may be selected from the products of granular, emulsion or solution polymerization of methyl methacrylate, with or without up to 5% by weight of other materials copolymerizable therewith. Alternatively, higher average molecular weight methyl methacrylate polymers comprising 55,000–105,000 molecular weight constituents may be treated by preferential solvency techniques to extract a portion within the desired range, or higher average molecular weight polymers may be milled strenuously as disclosed in copending applications Serial No. 192,152, filed on October 25, 1950, and Serial No. 516,232, filed June 17, 1955, both by L. W. Crissey and J. H. Lowell, and both now abandoned.

One specific method of preparing suitable methyl methacrylate polymers is by introducing suitable proportions of distilled methyl methacrylate monomer, catalyst and solvent into a closed reaction vessel equipped with a thermometer, agitator and reflux condenser, heating the contents with continuous agitation for about 2 to 9 hours, and then cooling to room temperature.

By using this method under a variety of conditions, as indicated in the following table, methyl methacrylate polymers having molecular weights required in this invention are obtained. All ingredients are shown by weight.

the distilled monomer disclosed, or substituting a different catalyst for those disclosed.

Other polymers of methyl methacrylate may be made in a similar manner.

The molecular weight values, as employed in the description of this invention and in the appended claims, are on the basis of weight average molecular weight. The values referred to as molecular weight are calculated from the equation $$M = 1.47 \times 10^6 (N_r - 1 - \ln N_r)^{0.65}$$

in which M is the molecular weight and $N_r$ is the relative viscosity of the polymer in question, specifically the value of the fraction $$\frac{(A) \quad \text{Efflux time of polymer solution}}{(B) \quad \text{Efflux time of solvent used in polymer solution}}$$

The efflux times are measured in accordance with the procedure of ASTM-D-445-46T Method B using, as the "oil" mentioned in said procedure, (A) a solution of 0.25 gram of the polymer of methyl methacrylate being tested in 50 cc. of ethylene dichloride, and (B) a sample of the ethylene dichloride used in making said solution, respectively. The determinations are run at 25° C. in a modified Ostwald viscosimeter, series 50.

By this method the polymers of methyl methacrylate employed in this invention have $N_r$ values (i.e., relative viscosities) between 1.117 and 1.196, which correspond to calculated molecular weight values of 55,000 and 105,000, respectively.

It should be understood, however, that the spraying and non-webbing characteristics are affected by such techniques as the method of polymerization and strenuous milling. Consequently, when special techniques are employed, the maximum solids that is sprayable without webbing may exceed the maximum values given in Table 1 by about 1½%. E.g., the 19.6% maximum for a molecular weight of 55,000 may be increased to about 21.1%.

The solvents which form a part of this invention may be prepared by mixing together appropriate proportions of a wide variety of organic liquids. The following is a tabulation of representative commercially available

TABLE 4B

*Methyl methacrylate polymers*

| Molecular Weight | Methyl Methacrylate | Solvent | | Catalyst | Temp., ° C. | Percent Conversion to Polymer | Reaction Time, Hours |
|---|---|---|---|---|---|---|---|
| | | Toluene | Acetone | | | | |
| 52,000 | 40 | 42 | 18 | 0.6 azo [1] | 130 | 72 | 9 |
| 55,000 | 40 | 42 | 18 | 0.362 benzoyl peroxide | 90 | 93 | 9 |
| 70,000 | 40 | 42 | 18 | 0.28 azo [1] | 130 | 65 | 9 |
| 73,000 | 50 | 8 | 42 | 0.3025 benzoyl peroxide | 92 | 99 | 6 |
| 85,000 | 50 | 35 | 15 | 0.2813 benzoyl peroxide | 92 | 99 | 6 |
| 88,000 | 50 | 8 | 42 | 0.27 benzoyl peroxide | 89 | 96 | 6 |
| 90,000 | 45 | 38.5 | 16.5 | 0.2417 benzoyl peroxide | 89 | 98 | 8 |
| 90,000 | 66.67 | 23.33 | 10.0 | 0.4 benzoyl peroxide | 100 | 98 | 2 |
| 102,000 | 62 | 26.6 | 11.4 | 0.341 benzoyl peroxide | 90 | 95 | 3 |
| 112,000 | 66.67 | 23.33 | 10.0 | 0.3333 benzoyl peroxide | 100 | 96 | 2 |

[1] Azo catalyst=alpha alpha' azodiisobutyronitrile.

Further variations will be obvious to those skilled in the art, such as substituting methyl methacrylate monomer stabilized with an inhibitor like hydroquinone for the distilled monomer disclosed, or substituting a different catalyst for those disclosed.

organic liquids from which solvent mixtures complying with the requirements of this invention may be prepared.

TABLE 5
Organic liquids

| Name | Boiling Range, ° C. | Aniline Point, ° C. | Remarks |
|---|---|---|---|
| Acetone | 54°–58° ASTM-D-268-46 | | |
| Methyl Ethyl Ketone | 78°–81° ASTM-D-268-46 | | |
| Amyl Alcohol | 112°–140° ASTM-D-268-46 | | |
| "Cellosolve" Acetate | 130°–175° ASTM-D-268-46 | | Ethylene Glycol Monoethyl Ether Acetate. |
| Ethyl Acetate (denatured) | 75°–85° ASTM-D-268-46 | | Denatured With Methyl Isobutyl Ketone. |
| Ethyl Alcohol (denatured) | | | Denatured With Acetone. |
| Isopropanol | 80°–84° ASTM-D-268-46 | | |
| Ethylene Dichloride | 80°–87° ASTM-D-268-46 | | |
| Butyl Lactate | 155°–200° ASTM-D-268-46 | | |
| Diacetone Alcohol | 130°–175° ASTM-D-268-46 | | |
| Diisobutyl Ketone | 163°–173° ASTM-D-268-46 | | |
| Cyclohexanone | 120°–170° ASTM-D-268-46 | | |
| Amyl Acetate | 90°–150° ASTM-D-268-46 | | |
| Butyl "Cellosolve" | 163°–175° ASTM-D-268-46 | | Ethylene Glycol Monobutyl Ether. |
| Cyclohexanol | 159°–163° ASTM-D-268-46 | | |
| Methyl Acetate | 54°–60° ASTM-D-268-46 | | |
| Furfural | 150°–168° ASTM-D-268-46 | | |
| Petroleum Naphtha | 88°–142° ASTM-D-86-46 | 53°–57° ASTM-D-611-47T [1] | 85–95% Aliphatics. |
| Toluene | 2° maximum range including 110.6° C. ASTM-D-850-47. | 30°–32° ASTM-D-611-47T [1] | |
| Cyclohexane | 2° maximum range including 80.8° C. ASTM-D-268-46. | | |
| Benzene | 2° maximum range including 80.1° C. ASTM-D-850-47. | | |
| Benzene Substitute | 65°–113° ASTM-D-86-46 | | |
| Toluene Substitute | 104°–114° ASTM-D-268-46 | | |
| Hexane | 55°–85° ASTM-D-86-46 | | |
| Toluene-Type Hydrocarbon | 95°–142° ASTM-D-268-46 | 41°–45°—Mixed aniline point ASTM-D-611-47T. | |
| Aromatic Hydrocarbon | 184°–219° ASTM-D-86-46 | 34°–40° ASTM-D-1012-49T [1] | 90–95% aromatics. |
| Hydrocarbon AN-1 | 170°–263° ASTM-D-86-46 | 36°–43° ASTM-D-1012-49T [1] | Approx. 95% aromatics. |
| Hydrocarbon #102 | 145°–205° ASTM-D-86-46 | 33°–37° ASTM-D-1012-49T [1] | |
| High Boiling Petroleum Naphtha | 130°–195° ASTM-D-86-46 | 27°–30°—Mixed aniline point ASTM-D-1012-49T. | 70–82% aromatics. |
| Xylene | 135°–146° ASTM-D-850-47 | 30°–34° ASTM-D-1012-49T [1] | |
| High Solvency Petroleum Hydrocarbon | 150°–190° ASTM-D-86-46 | 34°–38° ASTM-D-1012-49T [1] | Approx. 95% aromatics. |
| Diethyl Ether | | | |
| Methyl Amyl Acetate | 130°–150° ASTM-D-1078-49T | | |
| Butanol | 113°–118° ASTM-D-1078-49T | | |

[1] Standard test modified by using 3 volumes of aniline, 1 volume of sample and 2 volumes of n-heptane.

The following examples are illustrative of the principles and practice of this invention although it is not limited thereto. Unless otherwise indicated, the parts and percentages are by weight.

EXAMPLES 1–5

Polymer of methyl methacrylate coating compositions, which are representative of the concentrated lacquers of this invention, were prepared by grinding two mill bases having the following compositions:

| | Parts by Weight | |
|---|---|---|
| | Mill Base For Examples 1 and 5 | Mill Base For Examples 2, 3 and 4 |
| Polymethyl Methacrylate, Molecular Weight Approximately 77,000 | 4.17 | 4.17 |
| Titanium Dioxide Pigment | 8.33 | 8.33 |
| Toluene | 12.50 | |
| Acetone | | 12.50 |
| | 25.00 | 25.00 | in a conventional pebble mill for approximately two days, and subsequently adding to the resulting smooth dispersions the further ingredients required to provide concentrated lacquers having the following compositions:

TABLE 6
Concentrated lacquer compositions

| Example # | 1 | 2 | 3 | 4 | 5 |
|---|---|---|---|---|---|
| Polymethyl Methacrylate, Molecular Weight Approximately 77,000 | 29.77 | 29.77 | 29.77 | 29.77 | 29.77 |
| Dibutyl Phthalate Plasticizer | 11.90 | 11.90 | 11.90 | 11.90 | 11.90 |
| Titanium Dioxide Pigment | 8.33 | 8.33 | 8.33 | 8.33 | 8.33 |
| Solvent Mixture #1, Table 3 | 50.0 | | | | |
| Solvent Mixture #2, Table 3 | | 50.0 | | | |
| Solvent Mixture #3, Table 3 | | | 50.0 | | |
| Solvent Mixture #4, Table 3 | | | | 50.0 | |
| Solvent Mixture #5, Table 3 | | | | | 50.0 |

The maximum non-volatile solids content at which each of these lacquers could be sprayed was determined by mixing therewith small consecutive portions of the same solvent mixture used in the original preparation of each lacquer. Each lacquer was sprayed after each addition of solvent, in accordance with the general spraying test procedure previously described, using successively more dilute lacquers, until a lacquer was obtained which gave no evidence of webbing on the test panels, i.e., the particles were separated and round as in Figure 5.

Then, with each lacquer in its resulting thinned condition for spraying without webbing, three coats of each were sprayed on metal panels to determine the maximum thickness of a smooth coating which could be built up without encountering the sagging or curtaining which is characteristic of too thick a wet film. The spraying was done with a Binks #18 gun using a #63-PB cap, and #63-B tip and needle, with 65 p.s.i. gage air pressure at the nozzle and 15 p.s.i. gage air pressure on the lacquer reservoir.

About 1 to 4 minutes elapsed between the application of each successive coat. Lacquer #3 was air-dried at room temperature. The panels coated with lacquers #1, 2, 4 and 5 were placed in an oven about 2 to 5 minutes after the final coat was applied and were baked at 200° F. for 30 minutes. The resulting coatings were all smooth, uniform and free of sagging and surface roughness.

The amount of solvent added, the resulting non-volatile solids content, the resulting polymer content and the three-coat thickness for each lacquer are recorded in the following Table 7 in which the final compositions described are representative of the sprayable non-webbing coating compositions of this invention.

TABLE 7

Thinned lacquer compositions

| Concentrated Lacquer of Example # | 1 | 2 | 3 | 4 | 5 |
|---|---|---|---|---|---|
| Amount of Solvent Added per 100 Parts of Concentrated Lacquer (i.e., lacquer of Table 6) | 140 | 149 | 135 | 125 | 115 |
| Total Non-volatile Solids Content by Weight | 20.85 | 20.1 | 21.25 | 22.25 | 23.25 |
| Polymethyl Methacrylate Content, Based on Total Weight of Polymethyl Methacrylate and all solvent | 13.5 | 13.0 | 13.8 | 14.5 | 15.3 |
| Three Coat Dry Film Thickness in Mils | 2.1 | 4.0 | 3.0 | 1.9 | 1.9 |

It is noted that, with respect to each lacquer as thinned for conventional spray application, the polymethyl methacrylate content based on the total of the polymethyl methacrylate and solvent is always above the 10% minimum previously specified and below the 16.5% maximum permitted by curve ABCDE of Figure 1 for a molecular weight of 77,000, and that the three coat film thickness is above the required 1.5 mils. Similarly consistent results are obtained in the preparation, thinning and spraying of other lacquers containing polymers of methyl methacrylate having molecular weights other than 77,000 but within the 55,000–105,000 range defined in this invention. Similarly consistent results are likewise obtained in the preparation, thinning and spraying of analogous lacquers containing solvents 6-9 of Table 3 instead of solvents 1-5.

It is also noted that the incorporation of pigment and plasticizer in a mixture of a polymer of methyl methacrylate and solvent lowers the concentration of polymer (based on polymer and solvent alone) which can be sprayed without webbing. Hence, when the particularly desirable compositions of this invention, which contain substantial amounts of pigment and plasticizer, are prepared, the amount of polymer (based on polymer and solvent alone) will be somewhat lower than the maximum permitted for mixtures of polymer and solvent alone, as represented by the line ABCDE of Figure 1.

EXAMPLE 6

A mill base (concentrated pigment dispersion) was prepared by grinding the following composition in a conventional pebble mill for 24 hours.

Mill base

| | Parts by weight |
|---|---|
| Polymethyl methacrylate (molecular weight 59,000) | 10.0 |
| Titanium dioxide pigment | 20.0 |
| Toluene | 25.0 |
| | 55.0 |

To the resulting smooth dispersion were added 185 parts of a solution having the following composition:

Solution

| | Parts by weight |
|---|---|
| Polymethyl methacrylate (molecular weight 59,000) | 61.4 |
| Dibutyl phthalate | 28.6 |
| Acetone | 48.0 |
| Toluene | 11.0 |
| High solvency petroleum hydrocarbon | 24.0 |
| Amyl alcohol | 4.0 |
| "Cellosolve" acetate | 8.0 |
| | 185.0 |

The resulting product was a white concentrated polymethyl methacrylate coating composition of this invention, the solvent portion of which had the same composition as solvent #1 of Table 3.

It was determined that 83.1 additional parts of solvent #1 per 100 parts of concentrated coating composition were required to thin the composition so that it could be sprayed without webbing. The resulting sprayable lacquer had a non-volatile solids content of 27.3% by weight and a polymethyl methacrylate content of 18.2% by weight based on the total weight of polymethyl methacrylate and solvent. It is noted that the latter concentration is above the 10% minimum required in this invention and below the 19.0% maximum permitted by curve ABCDE of Figure 1 for a molecular weight of 59,000.

A panel was sprayed with three coats of the thinned lacquer and baked in substantially the same manner as in Examples 1, 2, 4 and 5. The resulting coating was 2.7 mils thick and was smooth, uniform and free of sagging and surface roughness.

EXAMPLE 7

A mill base was prepared by grinding the following composition in a conventional pebble mill for 24 hours.

Mill base

| | Parts by weight |
|---|---|
| Polymethyl methacrylate (molecular weight 101,000) | 10.0 |
| Titanium dioxide pigment | 20.0 |
| Toluene | 35.0 |
| | 65.0 |

To the resulting smooth dispersion were added 175 parts of a solution having the following composition:

Solution

| | Parts by weight |
|---|---|
| Polymethyl methacrylate (molecular weight 101,000) | 61.4 |
| Dibutyl phthalate | 28.6 |
| Acetone | 48.0 |
| Toluene | 1.0 |
| High solvency petroleum hydrocarbon | 24.0 |
| Amyl alcohol | 4.0 |
| "Cellosolve" acetate | 8.0 |
| | 175.0 |

The resulting product was a white concentrated polymethyl methacrylate coating composition of this invention, the solvent portion of which had the same composition as solvent #1 of Table 3.

It was determined that 427 additional parts of solvent #1 were required to thin the composition so that it could be sprayed without webbing. The resulting sprayable lacquer had a non-volatile solids content of 18.0% by weight and a polymethyl methacrylate content of 11.5% by weight based on the total weight of polymethyl methacrylate and solvent. It is noted that the latter concentration is above the 10% minimum required in this invention and below the 12.9% maximum permitted by curve ABCDE of Figure 1 for a molecular weight of 101,000.

A panel was sprayed with three coats of the thinned lacquer and baked in substantially the same manner as in Examples 1, 2, 4 and 5. The resulting coating was 1.9 mils thick and was smooth, uniform and free of sagging and surface roughness.

EXAMPLE 8

A concentrated polymethyl methacrylate coating composition was prepared by grinding the following ingredients until a smooth dispersion resulted.

| | Parts by weight |
|---|---|
| Polymethyl methacrylate (molecular weight 88,000) | 28.70 |
| Benzyl butyl phthalate | 12.90 |
| Titanium dioxide pigment | 8.10 |
| Phthalocyanine blue pigment | .15 |
| Carbon black pigment | .15 |
| Toluene | 35.00 |
| Acetone | 15.00 |
| | 100.00 |

A solvent mixture of the following composition was used to thin this lacquer:

| | Parts by weight |
|---|---|
| Toluene | 23.3 |
| Acetone | 43.1 |
| Amyl alcohol | 4.4 |
| "Cellosolve" acetate | 9.0 |
| High solvency petroleum hydrocarbon | 20.2 |
| | 100.0 |

Using the previously described test for spraying without webbing, it was determined that 144 parts by weight of this thinner per 100 parts of concentrated lacquer were required to yield a thinned lacquer which could be sprayed without webbing.

The solvent composition of the resulting thinned lacquer was approximately as follows:

| | Parts by weight |
|---|---|
| Toluene | 35.3 |
| Acetone | 39.7 |
| Amyl alcohol | 3.3 |
| "Cellosolve" acetate | 6.7 |
| High solvency petroleum hydrocarbon | 15.0 |
| | 100.0 |

The boiling range and solvency of this solvent mixture conforms to the requirements of Tables 2, 2A, 2B, and 2C.

The thinned sprayable lacquer had a non-volatile solids content of 20.5% by weight and a polymethyl methacrylate content of 12.9% by weight based on the total weight of polymethyl methacrylate and solvent. It is noted that the latter concentration is above the 10% minimum required in this invention and below the 14.7% maximum permitted by curve ABCDE of Figure 1 for a molecular weight of 88,000.

A panel was sprayed with three coats of the thinned lacquer and baked in substantially the same manner as in Examples 1, 2, 4 and 5. The resulting coating was 1.6 mils thick and was smooth, uniform and free of sagging and surface roughness.

SOLVENT #10

The following is a formula of another useful solvent composition meeting the requirements of this invention:

| | Parts by weight |
|---|---|
| Acetone | 23.2 |
| Hexane | 11.7 |
| Toluene | 15.8 |
| Xylene | 29.8 |
| Butanol | 2.9 |
| "Cellosolve" acetate | 16.6 |
| | 100.0 |

In addition to the polymers of methyl methacrylate having the particular molecular weights disclosed in the examples, other polymers having an average molecular weight between about 55,000 and about 105,000 may be used. Also mixtures of two or more such polymers may be used. The preferred molecular weight range is 75,000 to 95,000.

Although the homopolymers of methyl methacrylate are preferred in the practice of this invention, copolymers containing at least about 95% methyl methacrylate and not more than about 5% of other polymerizable material may be used in place of all or part of the homopolymer which would normally be employed in a lacquer of this invention. For instance, a copolymer containing about 98% of methyl methacrylate and 2% of methacrylic acid may be used as a partial or complete replacement for the polymethyl methacrylate used in the foregoing specific examples, with substantially equal results. Other useful materials which are copolymerizable with methyl methacrylate within the scope of the term "polymer of methyl methacrylate" include other short chain (i.e., 1–4 carbon) alkyl esters of acrylic and methacrylic acids, vinyl acetate, acrylonitrile and styrene.

While the preferred lacquers of this invention contain, as film-forming materials, only polymers of methyl methacrylate and plasticizers therefor, suitable lacquers may be prepared by incorporating other compatible film-forming materials with the aforementioned ingredients in proportions up to about 10% by weight based on the total weight of the film-forming constituents of the composition. Examples of such additive film-forming materials are cellulose nitrate, other cellulose esters, alkyd resins, and polymers of the short chain alkyl esters of acrylic and methacrylic acids other than polymethyl methacrylate. Obviously it is most convenient to incorporate the additive materials in the form of solutions.

The examples disclose a wide variety of particular solvent mixtures which fulfill the requirements of this invention. These are to be considered merely as illustrative and not as limitative of the invention. Even the organic liquids listed in Table 5 are merely representative of a wide variety of starting materials which can be blended to provide solvent mixtures having the previously defined requirements with respect to boiling range and solvency. It will be obvious to those skilled in the organic coating art that many other organic liquids having similar properties exist and may be substituted in appropriate proportions for the liquid specifically disclosed, provided the resulting mixtures have the required properties. Solvents #1 and 4 of Table 3 possess characteristics which are representative of the preferred solvents of this invention. These characteristics are recorded under solvents #1 and 4, respectively, in Table 4.

Many well-known plasticizers for polymers of methyl methacrylate may be employed in the compositions of this invention.

However, the particular plasticizer used affects the physical properties of the resulting coating, including cracking, crazing, flexibility, durability, etc. The preferred plasticizer is benzyl butyl phthalate, because it imparts the best overall balance of properties and especially the crack-resistance. Other plasticizers which will produce films having especially desirable properties are dibutyl phthalate, triphenyl phospate, 2-ethyl hexyl benzyl phthalate and dicyclohexyl phthalate. Other well-known plasticizers for polymers of methyl methacrylate which may be employed include diallyl phthalate, dibenzyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethyl hexyl ester of hexamethylene diphthalate, and di(methylcyclohexyl) phthalate. Plasticizers are normally employed in amounts of about 10–50% by weight based on the weight of the polymer of methyl methacrylate.

In addition to the pigments disclosed in the examples, a wide variety of other pigments commonly used in organic coating compositions may be used. Examples of such pigments include, titanium dioxide, carbon black, iron blues, phthalocyanine blues and greens; metal oxides, hydroxides, sulfides, sulfates, silicates and chromates; organic maroons, aluminum flake, bronze powders, pearl essence, and various fillers or extenders such as talc, barytes, china clay and diatomaceous earth.

It will be obvious to those skilled in the organic coating art that the amount of pigment used is not critical except that it must be high enough to provide the necessary hiding power. The amount of pigment, by weight based on the weight of the organic film-forming material, may vary between about 2% for light, high-hiding pigments, such as carbon black or aluminum, and about 100% for heavy, low-hiding pigments such as lead chromate.

It is common practice in the coating art to prepare liquid coating compositions on a commercial basis in a highly concentrated form. In comparison with the same composition in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. Therefore, the concentrated coating compositions from which the sprayable non-webbing polymer of methyl methacrylate lacquers of this invention may be prepared by merely admixing appropriate organic liquids form a part of this invention, provided that the resulting ready-to-spray coating compositions fulfill the requirements of this invention. The maximum degree of concentration, i.e. the maximum non-volatile solids content, is limited only by the maximum consistency which can be conveniently handled by the manufacturer and the ultimate user. While concentrated lacquers having a non-volatile solids content of 75% by weight, or even higher, may be prepared; the normal concentration is usually between 30% and 60%. The minimum concentration is obviously the solids content of the ready-to-spray lacquers; but, as previously mentioned, such compositions are not usually prepared by the manufacturer because they are not adaptable to adjustment by the user.

The method of dispersing or grinding pigment in the film-forming materials is not critical provided a smooth, uniform dispersion of finely divided pigment is produced. Examples of suitable equipment well known in the art are ball, pebble, buhrstone, roller, and colloid mills and kneader-mixers, such as Banbury or Werner-Pfleiderer.

It is to be understood that the utility of the coating compositions of this invention is not limited to coatings comprising three separate coats. As previously mentioned, a preferred maximum of three coats is a criterion of industrial lacquer users. In the description of this invention, the characteristics of a three-coat system are employed merely as a measure of the ability of the coating compositions to comply with industrial requirements. The products of this invention provide useful coatings when applied in one, two, three, four or even more separate coats; but obviously the optimum results from the standpoint of economy and convenience are obtained in in three coats or less.

While the examples show baking as a step in the preparation of coatings from the products of this invention, the baking step is not essential. Baking is mainly a means of shortening the drying period to a minimum. If desired, the coatings may be air dried under normal conditions of atmospheric temperature and humidity with good ventilation. Air drying to a stage which permits handling usually requires 4-24 hours. Baking at 150°-200° F. normally reduces the drying time to 30-60 minutes, whereas baking at 250°-300° F. reduces the time to 15-20 minutes.

The coating compositions of this invention are useful for applying decorative and protective coatings to articles manufactured from a variety of materials, such as wood, metal, ceramics and other organic and inorganic substances. In many cases, such as in coating metal, it may be desirable first to coat the substrate with a suitable priming composition.

While conventional air spraying is the preferred method of applying the products of this invention, obviously other methods may be used, such as hot air spraying, steam spraying, electrostatic spraying, spraying a preheated coating composition, dipping, brushing, and rollercoating. This application is a continuation-in-part of Serial No. 402,498, filed January 6, 1954, now abandoned, by Laverne W. Crissey and John H. Lowell.

It is apparent that many widely different embodiments of this invention may be made without departing from the spirit and scope thereof; and, therefore, it is not intended to be limited except in accordance with the appended claims.

We claim:

1. A sprayable non-webbing coating composition comprising a polymer of methyl methacrylate of 55,000–105,000 molecular weight and solvent therefor, said polymer of methyl methacrylate being a member of the group consisting of (a) homopolymers of methyl methacrylate, (b) copolymers of methyl methacrylate and another material copolymerizable therewith containing at least about 95% by weight of polymerized methyl methacrylate, (c) mixtures of such homopolymers, (d) mixtures of such copolymers and (e) mixtures of such homopolymers and copolymers, said other material being a member of the group consisting of methacrylic acid, a 1–4 carbon atom alkyl ester of acrylic acid, a 2–4 carbon atom alkyl ester of methacrylic acid, vinyl acetate, acrylonitrile and styrene, and said polymer of methyl methacrylate being present in an amount by weight, based on the total weight of polymer and solvent, between a minimum of 10% and a maximum up to 19.6%, said maximum varying with the molecular weight in accordance with the following table:

| Molecular weight: | Percent polymer by weight |
|---|---|
| 55,000 | 19.6 |
| 59,000 | 19.0 |
| 77,000 | 16.5 |
| 92,000 | 14.1 |
| 101,000 | 12.9 |
| 105,000 | 12.4 | said solvent being a mixture of organic, non-polymerizable, non-reactive liquids and consisting of fractions having boiling ranges in accordance with the following table:

| 20% fraction by volume: | Boiling range, °C |
|---|---|
| First | 50–121 |
| Second | 64–122 |
| Third | 67–142 |
| Fourth | 73–159 |
| Fifth | 90–175 | said solvent and fractions thereof having minimum comparative solvencies in accordance with the following table:

| Percent by Volume Distilled Off | Percent by Volume Remainder | Minimum Comparative Solvency of Remainder |
|---|---|---|
| 0 | 100 (whole solvent) | 0.39 |
| 20 | 80 | 0.46 |
| 40 | 60 | 0.23 |
| 60 | 40 | 0.06 |
| 80 | 20 | 0.00 | said molecular weight being calculated from the equation $M = 1.47 \times 10^6 (N_r - 1 - \ln N_r)^{0.65}$ in which M is the molecular weight and $N_r$ is the relative viscosity of the polymer and is the quotient obtained by dividing the efflux time of a solution of 0.25 gram of a polymer in 50 cc. of ethylene dichloride by the efflux time of ethylene dichloride, said efflux times being measured in accordance with the procedure of ASTM D-445-46T, Method B at 25° C. using a modified Ostwald viscosimeter, series 50; and said comparative solvency of a solvent fraction being the quotient obtained by dividing (1) the number of cc. of heptane required to titrate 25 cc. of a 1% solution of said polymer of methyl methacrylate in a 125 cc. Erlenmeyer flask to an end point characterized by a cloud which obscures 10 point print as described in ASTM D-1132-50T, said 1% solution being prepared by mixing with the solvent fraction sufficient of a 25% solution of said polymer in toluene to give a 1% solution of said polymer, by (2) the number of cc. of heptane required to titrate 25 cc. of a 1% solution of said polymer in toluene in a 125 cc. Erlenmeyer flask to a like end point.

2. The coating composition of claim 1 containing a plasticizer of the group which consists of benzyl butyl phthalate, dibutyl phthalate, triphenyl phosphate, 2-ethyl hexyl benzyl phthalate and dicyclohexyl phthalate.

3. The coating composition of claim 1 containing benzyl butyl phthalate.

4. The coating composition of claim 1 containing from about 2% to 100%, based on the weight of organic film-forming material in said composition, of a pigment.

5. The coating composition of claim 1 in which the polymer of methyl methacrylate is (b), a copolymer of methyl methacrylate and a material copolymerizable therewith.

6. The coating composition of claim 1 in which the polymer of methyl methacrylate is a homopolymer of methyl methacrylate.

7. The coating composition of claim 1 in which the polymer of methyl methacrylate comprises (b), a copolymer of methyl methacrylate.

8. The coating composition of claim 1 in which said solvent and fractions thereof have comparative solvencies substantially in accordance with the following table:

| Percent by Volume Distilled Off | Percent by Volume Remainder | Range of Comparative Solvency of Remainder |
| --- | --- | --- |
| 0 | 100 (whole solvent) | 0.39-2.16 |
| 20 | 80 | 0.46-2.17 |
| 40 | 60 | 0.23-2.13 |
| 60 | 40 | 0.06-2.11 |
| 80 | 20 | 0.00-2.08 |

9. The coating composition of claim 3 containing from about 2% to 100%, based on the weight of organic film-forming material in said composition, of a pigment.

10. The coating composition of claim 3 in which the polymer of methyl methacrylate is a homopolymer of methyl methacrylate.

11. The coating composition of claim 3 in which the polymer of methyl methacrylate comprises (b), a copolymer of methyl methacrylate.

12. The coating composition of claim 3 in which the polymer of methyl methacrylate comprises a copolymer of methyl methacrylate and methacrylic acid, with the methyl methacrylate constituting at least 95% of the material that is copolymerized.

13. The composition of claim 8 in which the polymer of methyl methacrylate has a molecular weight of 75,000 to 95,000.

References Cited in the file of this patent

UNITED STATES PATENTS

| | | |
| --- | --- | --- |
| Re.23,753 | Bjorksten | Dec. 15, 1953 |
| 2,063,078 | Barrett | Dec. 8, 1936 |
| 2,204,517 | Strain | June 11, 1940 |

OTHER REFERENCES

Strain et al.: "Industrial and Engineering Chem.," volume 31, April 1939, pages 382-387.

Strain: "Industrial and Engineering Chem.," volume 32, April 1940, pages 540-541.